United States Patent [19]

Farrell

[11] 4,189,228
[45] Feb. 19, 1980

[54] APPARATUS FOR DETECTING LOCATORS ON A FILM STRIP

[75] Inventor: Robert J. Farrell, Rochester, N.Y.

[73] Assignee: Eastman Kodak Company, Rochester, N.Y.

[21] Appl. No.: 8,662

[22] Filed: Feb. 2, 1979

[51] Int. Cl.² ............................................. G03B 27/52
[52] U.S. Cl. ...................................... 355/41; 352/92; 352/224; 355/50; 355/75
[58] Field of Search ...................... 355/41, 50, 51, 75; 271/226, 227, 240, 253; 250/548, 561, 571; 352/160, 224, 236, 92; 226/198

[56] References Cited

U.S. PATENT DOCUMENTS

| | | | |
|---|---|---|---|
| 1,404,773 | 1/1922 | Hunt | 352/22 X |
| 2,011,272 | 8/1935 | Duggan | 352/92 |
| 2,995,979 | 8/1961 | Gordon et al. | 355/75 |
| 3,358,894 | 12/1967 | Hags | 226/198 |
| 3,558,223 | 1/1971 | Hemphill | 355/75 |
| 4,120,572 | 10/1978 | Grallert et al. | 352/92 |

Primary Examiner—Richard A. Wintercorn
Attorney, Agent, or Firm—N. Rushefsky

[57] ABSTRACT

An apparatus for detecting a locator, e.g. a notch, perforation or mark, associated with each frame of an elongated film strip that is advanced through the apparatus. The apparatus includes guide members that are supported adjacent opposite longitudinal edges of the strip and a detector, such as a photoelectric cell and a light source, for sensing the locators. The guide members and the detector are coupled for movement in a direction transverse to the general direction of advancement of the strip and move in response to transverse wavering movement of the strip to ensure proper positioning of the detector relative to the locators as the locators approach the detector.

3 Claims, 4 Drawing Figures

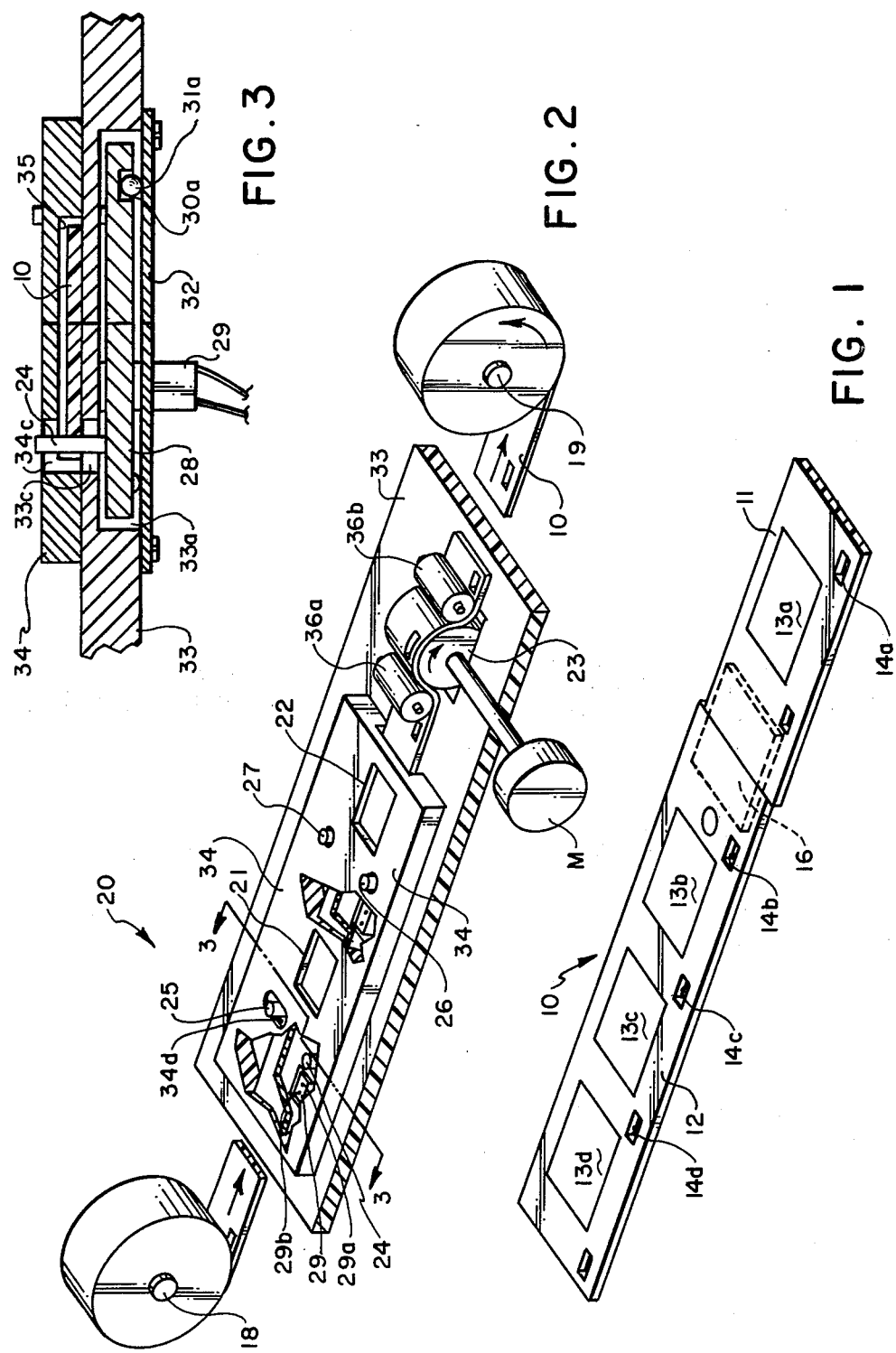

APPARATUS FOR DETECTING LOCATORS ON A FILM STRIP

BACKGROUND OF THE INVENTION

1. Field of the Invention

In its broader aspects, the present invention relates generally to the field of strip handling and more particularly to apparatus for detecting a locator or locators associated with a strip even though the strip is subject to wavering movement as it is advanced through the apparatus. In a preferred species, the present invention pertains to a photographic printer that includes means for detecting a locator, e.g. a perforation, notch or mark, associated with each image frame of a film strip that is advanced through the printer, even though the strip is subject to wavering movement as it is advanced through the printer.

2. Description of the Prior Art

In the prior art it is known in the photo-finishing arts to receive strips of exposed photographic negative frames from various customers and to join like types of film, e.g. size 110 film, end-to-end to form one elongated film strip that may be conveyed first through a photographic film processor to develop the exposed frames and then through an automatic photographic film printer, such as the 2610 Color Printer manufactured by Eastman Kodak Company, Rochester, New York, to reproduce images on the negative frames onto positive photographic print material. The strips are then separated from each other and, after processing of the positive print material, returned to the customers with matching positive prints. In an automatic printer that includes both a negative frame scanning gate and a negative frame printing gate, the strip is removed from a supply spool and incrementally advanced through these gates towards a take-up spool. Each frame is serially located first within the scanning gate and then within the printing gate. The two gates are so located relative to one another as to permit simultaneous scanning of one frame and printing of another frame onto photographic print material that is incrementally moved through the printer in synchronism with the movement of the frames of the film strip. In the vicinity of the scanning gate, the printer includes suitable apparatus for scanning the negative frame in the gate. This is done to obtain information relative to the photographic exposure characteristics of the negative, which information is useful in making a print from the negative when the negative frame is subsequently moved to the printing gate.

A factor associated with the printing and scanning operations is alignment of the frames in the respective gates. If the film strip is comprised of either size 110 or size 126 negatives, each frame will have one perforation or sprocket hole that is associated with the frame. A pawl may be provided on the printer adjacent the scanning gate to detect a perforation by entering it and thereby locating the particular frame in proper position relative to the scanning gate. Suitable means may be provided for sensing the movement of the pawl into the perforation for stopping the drive to the film strip. Since a uniform pitch is provided between frames, another frame will be positioned in the printing gate.

If the film strip is comprised of size 135 negatives, each frame will have adjacent thereto a notch formed in one edge of the film strip. The notch serves as a locator or identifier for that frame and can be detected by a photoelectric pickup device. The device, upon detection of this notch, produces a signal that is delivered to a computerized control which determines the appropriate time to issue a signal to terminate a drive that is advancing the strip. The strip will then be stopped and the appropriate frame will be located in the scanning gate. Because the pitch between size 135 type negative frames is not always uniform, simultaneous scanning of one negative while another is being printed may be accomplished by having the film strip form a free loop between the scanning gate and the printing gate. This permits one frame to be precisely located in the scanning gate and another frame to be simultaneously precisely located in the printing gate.

As described above, the operation of locating a negative frame in the scanning gate assumes that a locator for each frame is detected by a detector such as a pawl or a photoelectric pickup device. To ensure the detection of these locators it has been the practice heretofore to constrain transverse movement of the strip adjacent the detector so that the locators cannot bypass the detector as the strip is advanced. The transverse constraint has been accomplished by providing two pins, one for each lateral edge of the strip, and fixing these pins a distance apart approximately equal to the nominal width of the film strip. The pins and detector are located adjacent the scanning gate so that the locator for each frame may be detected prior to the frame's being completely positioned within the scanning gate. The pins, because of their close proximity to the scanning gate, also serve to align the frame against transverse offset movement while the frame is in the scanning gate. A similar set of pins and another detector may be associated in a like manner with the printing gate.

A problem associated with printers of the kind described above arises from the fact that an elongated film strip formed by splicing together a plurality of very much shorter film strips is likely to have splices at which the meeting ends of the strips are not precisely aligned. When conveying the imprecisely formed elongated film strip and simultaneously imposing constraints against lateral movement, such as by pins at the scanning and printing gates, the elongated film strip tends to waver where it is not constrained. In the printer described above, wavering movement of a size 110 or size 126 film strip was allowed to occur where the film strip was supported on a drive roller that was located downstream of the printing gate. The drive roller was driven by a tendency drive arrangement; thus, some slip between the roller and strip was tolerable and the strip could be allowed to waver along the roller in an axial direction. In the case of a size 135 film strip, the free loop provided between the gates permitted the film strip to waver while being rigidly constrained at each of the two gates. The presence of the free loop, however, required an additional drive arrangement to drive the film strip from the scanning gate into the free loop.

In the case of a size 135 film strip it would be desirable to eliminate the need for a free loop since an extra motor is required to maintain the loop. Even though elimination of the free loop removes the possibility of precisely simultaneously locating out-of-pitch frames in both the scanning and printing gates, it has been found that precise location of a negative in the scanning gate is unnecessary. Thus, after precisely aligning a frame in the printing gate, suitable computer controlled means can be provided for determining if a sufficient portion of a negative is located in the scanning gate to provide a reasonably accurate assessment of the exposure characteristics of the negative. If a sufficient portion of the negative is so located then the negative can be scanned simultaneously with the printing of a negative in the printing gate. If a sufficient portion of the negative is not so located then the negative in the printing gate can be printed and the drive thereafter advanced to locate a sufficient portion of the negative in the scanning gate.

It would also be desirable when printing from size 110, size 126 and size 135 film strips to provide a positive drive, such as from a stepper motor, for feeding the strip through the gates. The use of a positive drive assures that no slip will occur between a drive roller that is positively driven and the film strip that it is driving, and thus permits accurate computer-controlled movement and stopping of the strip. In addition, the positive drive eliminates the need for an additional motor for pulling a strip from the supply spool as was required for the tendency drive arrangement described above. Furthermore, it eliminates the need for a pawl to stop the strip as the strip is immediately stopped when the drive roller stops. Since the film strip will still tend to waver, it is possible that the strip, when constrained against transverse movement by the drive roller and by the respective pins located at the gates, will waver while passing over the detector. The wavering could be to such an extent that locators for some frames will not be detected by the detector, thereby adversely affecting the operation of the printer.

SUMMARY OF THE INVENTION

The invention ensures the detection of a locator on a strip (or web) that is subject to wavering movement as it is being longitudinally advanced. The invention includes means for detecting the locator, and first and second strip-guiding means that are supported adjacent opposite longitudinal edges of the strip for contacting the edges thereof to position the strip relative to the detecting means. The invention further includes the improvement of coupling the first and second guiding means to the detecting means and supporting the first and second guiding means and the detecting means for movement in a direction transverse to the general direction of advancement of the strip, which movement is in response to transverse wavering movement of the strip.

As used herein the term "transverse wavering movement" of a strip refers to generally a side-to-side movement of the strip; i.e., a movement that is in the plane of the strip but generally perpendicular to the direction of general advancement of the strip.

For a fuller understanding of the nature and object of the invention, reference should be made to the following detailed description taken in conjunction with the accompanying drawings.

BRIEF DESCRIPTION OF THE DRAWINGS

FIG. 1 is a perspective view of a portion of an elongated film strip that the apparatus of the invention is particularly well suited to handle.

FIG. 2 is a perspective view of a portion of a photographic printer that incorporates the apparatus of the invention.

FIG. 3 is a sectional view of the apparatus taken on the line 3—3 of FIG. 2.

DESCRIPTION OF THE PREFERRED EMBODIMENT

Figure 4:
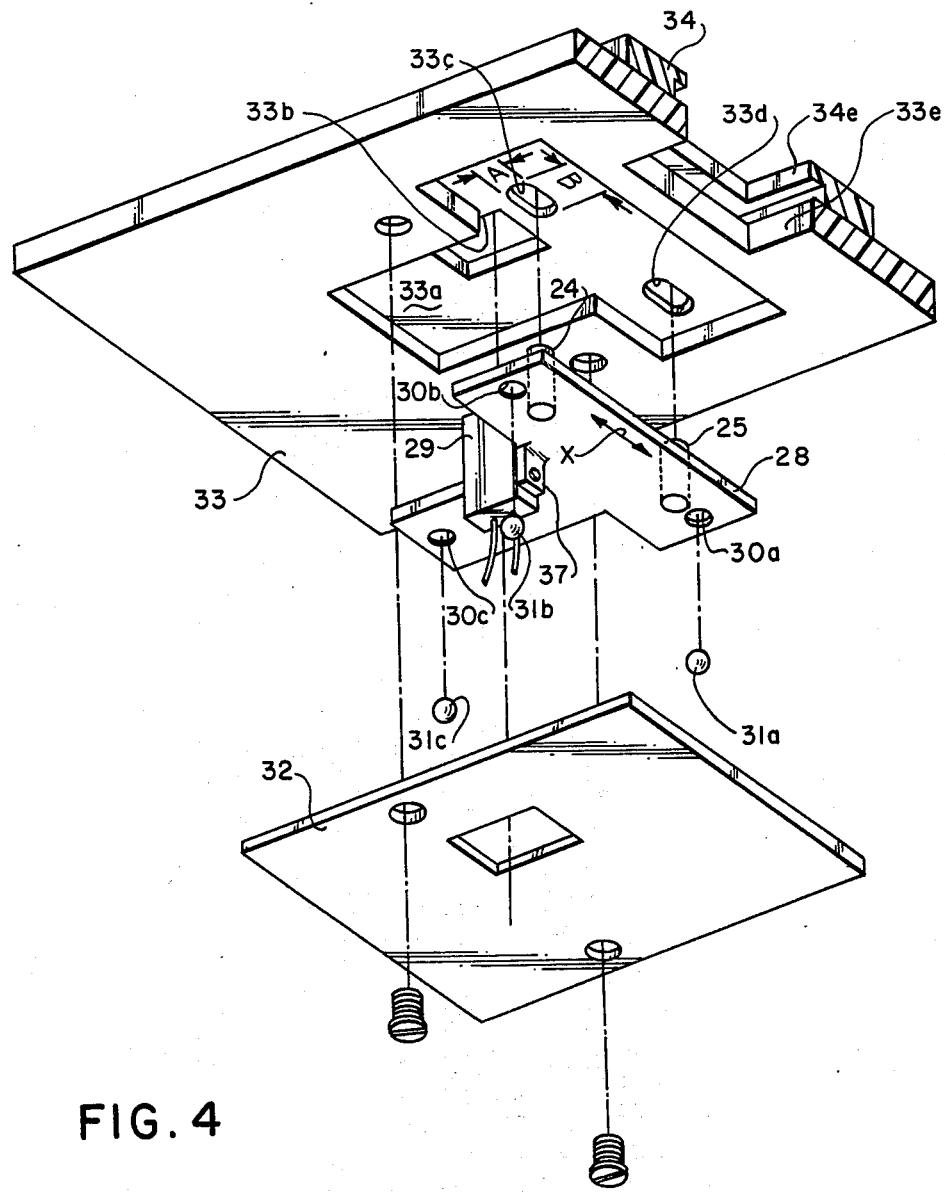
FIG. 4 is an exploded view of a portion of the apparatus shown in FIG. 2.

The invention is particularly suited for use in a photographic printer, and description of a preferred embodiment of the invention will now be made with respect to such an apparatus. Because photographic printers of the type described herein are well known, the present description will be directed to elements forming part of or cooperating more directly with the present invention which relates to apparatus for detection of locators on a strip (or web).

With reference now to FIG. 1, there is shown a portion of an elongated film strip 10 that is formed by splicing together many shorter film strips 11, 12. The formation of such an elongated film strip 10 is made by a photofinisher to facilitate advancement of the strips 11, 12 through a film processor and film printer. The strips 11, 12 are butt spliced; i.e., joined together end-to-end by a suitable tape 16. As may be noted, the end of the strip 11 is not precisely aligned edge-wise with the end of strip 12. Such a situation could be typical of several other splices in the elongated film strip. It will be noted that each negative frame 13a, 13b, 13c, 13d has associated therewith a perforation 14a, 14b, 14c, 14d respectively, each of which are located a precise fixed distance from a respective frame and thus may serve as a locator for that frame. As indicated previously, in lieu of perforations, notches may be provided along one edge of the strip 10 to identify each frame as is the known practice for size 135 film strips.

With reference now to FIG. 2, an apparatus 20 is shown which comprises a portion of a photograph printer. The apparatus includes a scanning gate 21, a printing gate 22 and a drive roller 23. The strip is unwound from a supply spool 18 and threaded through the apparatus so that each frame is serially conveyed from the scanning gate to the printing gate and is then taken-up by a tendency driven take-up spool 19. At the scanning gate suitable known means may be provided for permitting the viewing of each frame seriatim to obtain exposure information about the frame. The viewing may be automatically accomplished, for example, by a scanning apparatus that takes a point by point scan of the frame and, with the use of a computer, converts the density and color characteristics of each point into appropriate signals for controlling the printing of the frame. While one frame is being scanned or viewed by the scanning apparatus another frame may be printed at the printing gate using exposure information derived when the latter frame was previously located in the scanning gate. The printing of the frame may be accomplished by projecting light through the frame onto a suitable photographic print material that is incrementally advanced through the apparatus in synchronism with the film strip 10. The exposure of the print material may be controlled by suitable filters that are inserted at appropriate times to selectively terminate exposure in a respective primary color.

The apparatus further includes guide pins 24, 25 at the scanning gate 21 and guide pins 26, 27 at the printing gate 22. Guide pins 24, 25 are spaced from each other a distance substantially equal to the nominal width of the film strip 10. As may be noted from FIGS. 3 and 4, the pins 24, 25 are rigidly mounted on a movable plate or carriage 28. Plate 28 also has rigidly mounted thereto a photoelectric detector 29 that may include a light source 29a and photoelectric cell 29b. The detector is mounted to the plate by a bracket 37 (FIG. 4) that is fastened to the plate 28. As may be noted, suitable electrical wires are associated with the detector for delivering electrical power to the light source 29a and for coupling the cell 29b to suitable electrical circuitry for enabling the cell 29b to sense a perforation. As the strip passes over the detector, the detector will detect each perforation when light from the source 29a fails to get reflected by the film to the cell 29b but instead passes through the perforation. The detector thus must be located in a position such that each perforation will pass over the detector. Plate 28 has 3 circular recesses 30a, 30b, 30c formed in the underside of the plate which serve as seats for respective balls 31a, 31b, 31c that support plate 28 for transverse movement on bottom plate 32. Plate 28 is located in a recess 33a formed in the underside of an intermediate plate 33. As may be noted in FIG. 4, plate 33 has three apertures extending therethrough in the area of the recess 33a. Aperture 33b is of a size suitable to receive the detector 29. Apertures 33c, 33d are of identical size and respectively receive pins 24, 25 which extend through the apertures. The narrow dimension "A" of each of the pin receiving apertures 33c, 33d is of a width slightly greater than the respective pins which extend therethrough to minimize movement of the pins in the direction of advancement of the strip. The dimension "B" of each of the pin receiving apertures is long enough to permit for any movement of the pins in the direction of arrows "X" in response to tranverse wavering movement in the strip. As the detector also moves in the directions "X" the aperture 33b is suitably dimensioned to permit movement of the detector in these directions but permits substantially no movement in the direction of advancement of the strip. A cover plate 34 is located above and rests upon intermediate plate 33. The cover plate includes on its under surface a recess 35 for cooperating with the top of the intermediate plate to define a channel within which the strip may be conveyed. The cover plate further includes apertures 34c, 34d (FIGS. 2 & 3) that are in line, respectively, with apertures 33c, 33d of the intermediate plate to allow the pins 24, 25 to also extend through and move within the respective cover plate apertures. The plates 33 and 34 each additionally have an aperture 33e, 34e (FIG. 4) respectively that is suitably aligned to permit for scanning of the negative.

Downstream of the scanning gate, suitable apertures may be formed in cover plate 34 for providing for a printing gate. The printing gate differs from the scanning gate just described in that the pins 26, 27 may be fixed to intermediate plate 33 and need not move. Thus no movable plate or carriage need be provided at this gate.

It can be seen therefore that any transverse wavering movement in the film strip 10 against the guide pins 24, 25 will cause the entire plate 28 to be shifted in response to a movement of strip 10. As the detector is coupled and supported for movement with the pins the detector will be a fixed distance from the appropriate edge of the strip and will therefore be in position to detect properly placed locators on the strip as the locators serially approach the detector. Because the film is allowed to waver in the scanning gate no free loop need be provided between the scanning and printing gates nor is it necessary to permit for slipping movement of the strip upon drive roller 23. Thus drive roller 23, which is located downstream of the printing gate may be a positive drive and incremented by a suitable stepping motor "M" that is operably coupled to the drive roller 23. Pressure rollers 36a, 36b may be provided adjacent drive roller 23 to ensure a proper "wrap" of the strip about the drive roller for such positive drive.

From the above it will be understood by those skilled in the art that I have provided an improved apparatus for detecting locators on film strips that is especially useful for a strip that is subject to wavering movement as it is being advanced.

The invention has been described in detail with particular reference to preferred embodiments thereof, but it will be understood that variations and modifications can be effected within the spirit and scope of the invention.

What is claimed is:

1. In an apparatus for detecting one or more locators on a strip which is subject to transverse wavering movement as it is longitudinally advanced, said apparatus having means for detecting the locators, and first and second guiding means disposed adjacent opposite longitudinal edges of the strip for contacting the edges to position the strip relative to the detecting means, the improvement comprising:
   means supporting the first and second guiding means and the detecting means and operable to move transversely, in response to tranverse wavering movement of the strip against the guiding means, for maintaining the detecting means in a substantially constant position relative to each locator as it approaches the detecting means.

2. In an apparatus for detecting one or more locators formed on an elongated strip which is subject to transverse wavering movement as it is longitudinally advanced, said apparatus having detecting means for detecting the locators, and first and second guiding pins supported adjacent opposite longitudinal edges of the strip for contacting the edges to position them relative to the detecting means, the improvement which comprises:
   means including carriage means for supporting the first and second guiding pins and the detecting means for movement (a) in a direction transverse to the longitudinal direction of advancement of the strip, and (b) in response to transverse wavering movement of the strip against the guiding pins.

3. In a photographic printer for forming on photographic print material photographic prints from individual frames located on a plurality of film strips, the strips being joined together at their respective ends to form one elongated film strip that may be conveyed through the printer, the printer including a first gate means for permitting viewing seriatim of the frames for the obtaining of exposure information about such frames when located in the gate means and a second gate means located downstream of the first gate for permitting the printing seriatim of the frames when located within the second gate means onto the print material, positive driving means located downstream of the second gate means for advancing the strip longitudinally so that the frames may be moved from the first gate means towards the second gate means without slippage of the strip relative to the driving means, detecting means for detecting a locator associated with each frame, first and second guiding means supported adjacent opposite longitudinal edges of the strip for contacting the edges thereof to position the strip relative to the detecting means to ensure that the locators are serially properly placed relative to the detecting means, and the improvement which comprises:

means coupling the first and second guiding means to the detecting means and supporting the first and second guiding means and the detecting means for movement in a direction transverse to the direction of general advancement of the strip by the driving means, said movement of the guiding means and the detecting means being responsive to transverse wavering movement of the strip against the guiding means as the strip is being advanced by the driving means.

* * * * *